June 9, 1964　　　　　　　D. J. MUNSON　　　　　　　3,136,271
TRAY RACK FOR SERVING CARTS
Filed June 13, 1962　　　　　　　　　　　　　　　2 Sheets-Sheet 1
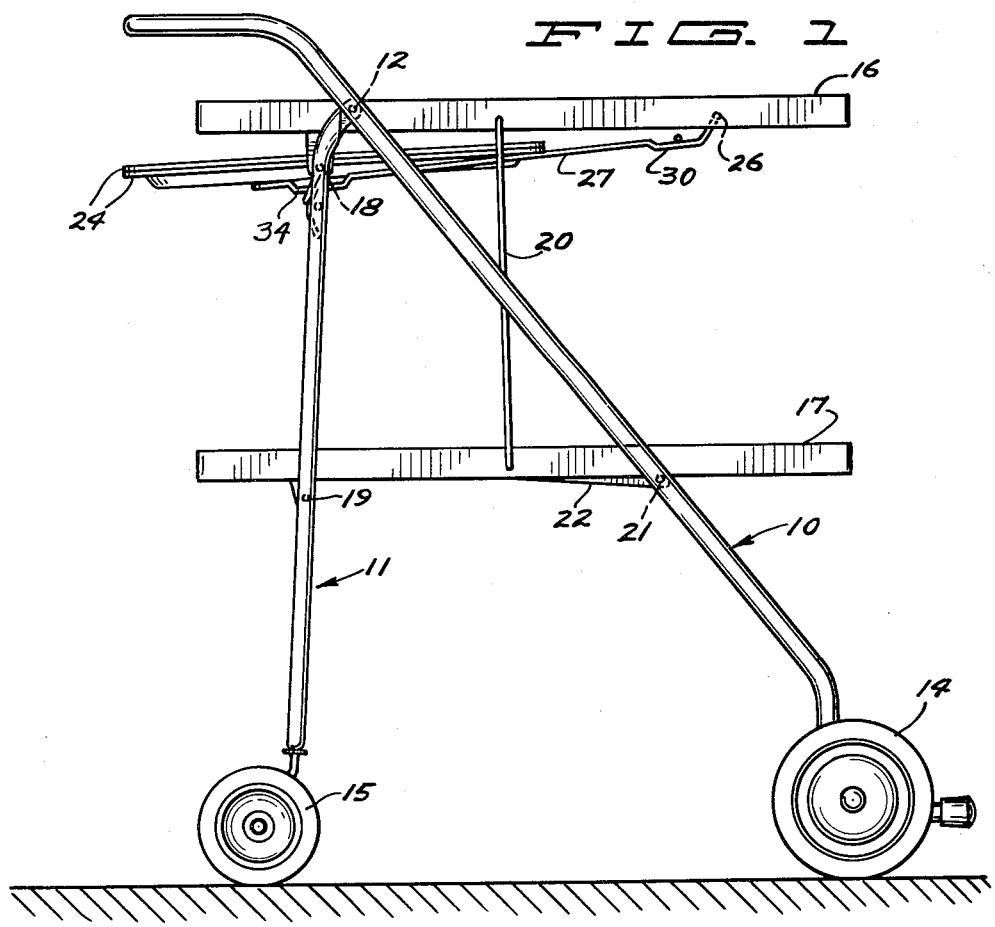
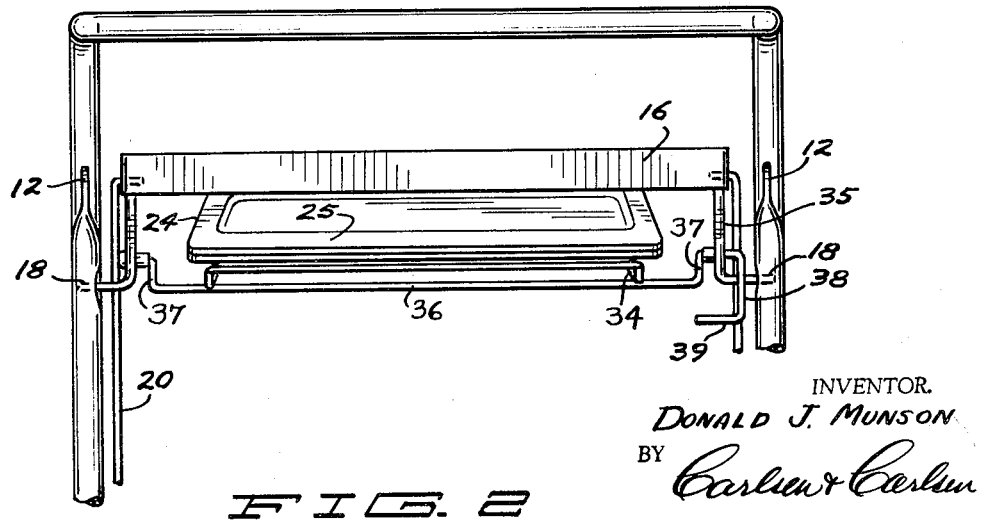
INVENTOR.
DONALD J. MUNSON
BY Carlsen & Carlsen
ATTORNEYS

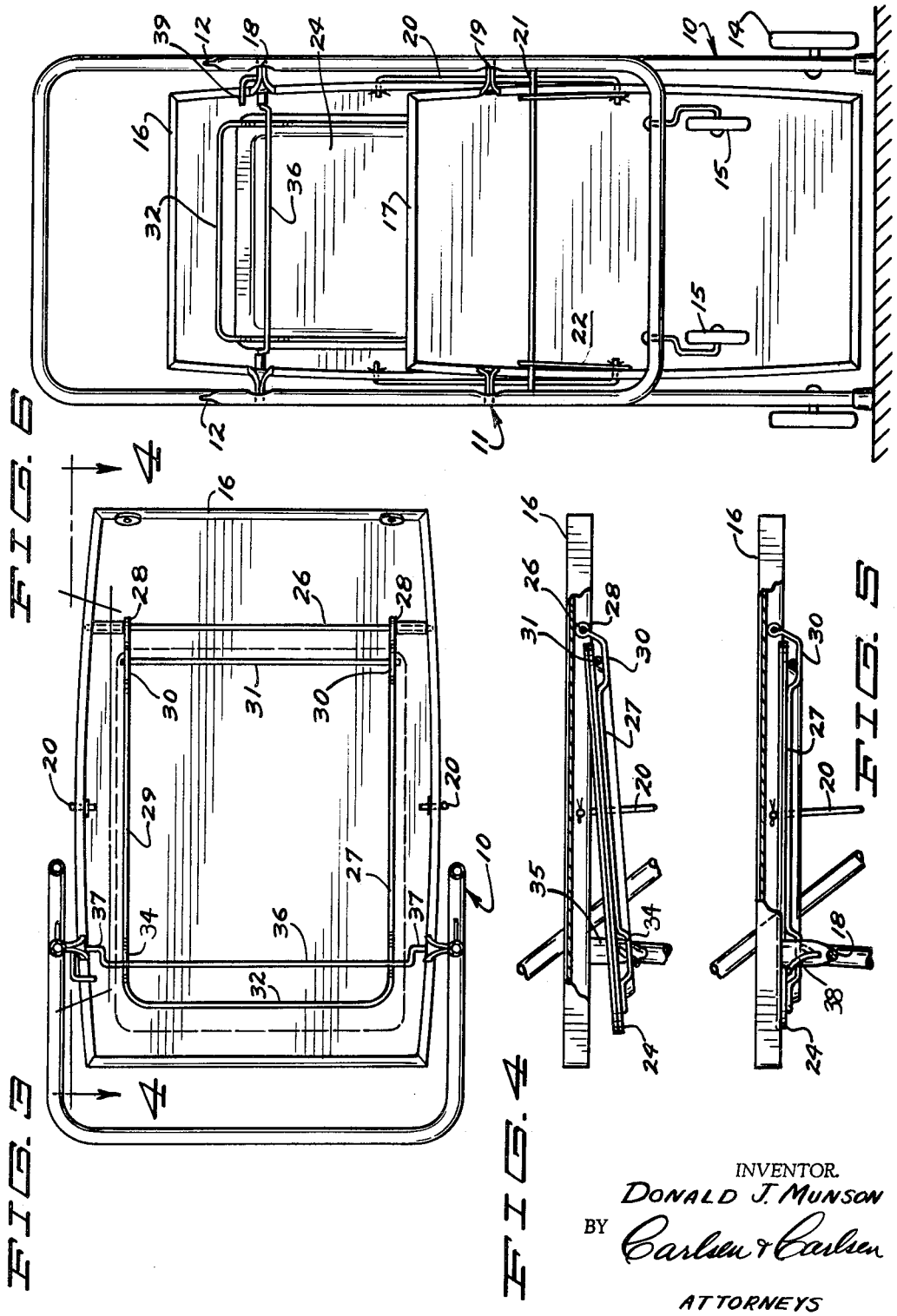

United States Patent Office 3,136,271
Patented June 9, 1964

3,136,271
TRAY RACK FOR SERVING CARTS
Donald J. Munson, Minneapolis, Minn., assignor to The J. R. Clark Company, Spring Park, Minn., a corporation of Minnesota
Filed June 13, 1962, Ser. No. 202,212
7 Claims. (Cl. 108—111)

This invention relates generally to improvements in serving carts or the like and particularly concerns a means for mounting individual serving trays on the cart in an inconspicuous yet readily accessible position.

It is common to use wheeled serving carts for transporting food or beverages from the preparation area to the area of service. It is also common and desirable to have individual serving trays at hand for serving persons from the cart.

A primary object of the present invention is to provide a new and improved means for storing a stack of individual serving trays on a serving cart or the like.

Another object of the invention is to provide a means of storing serving trays on a collapsible serving cart in such a manner as to not interfere with erecting and collapsing operation of the cart and which allows removal or replacement of the trays with the cart in either erected or collapsed condition.

Still another object of the invention is to provide a rack for holding a plurality of individual trays in a concealed position on the underside of a tiltable top or shelf member in such a manner as to not release the trays when the member is moved to its tilted position.

With the above mentioned objects in view the invention broadly comprises a generally rectangular frame adapted to marginally engage and support a stack of individual trays, said frame having one end portion hinged to the underside of a serving cart shelf for movement of the frame between a relatively closed position against the shelf in which the trays are held against removal and a position spread relatively downward from the shelf permitting withdrawal of the trays therefrom, and a locking means acting between the shelf and frame for locking the latter in its closed position.

The above and further objects of the invention will be brought to light during the course of the following specification, reference being made to the accompanying drawings, in which—

FIG. 1 is a side elevation of a wheeled serving cart embodying the present invention and showing the tray rack in open position with the trays partially inserted.

FIG. 2 is a rear elevation of the upper portion of the cart and again showing the tray rack open for removal or insertion of the serving trays.

FIG. 3 is an inverted plan view of the tray rack and the cart upper shelf with the rack open and showing the tray position in broken lines.

FIG. 4 is a fragmentary side elevation of the upper shelf partially broken away to show the full rack in open position.

FIG. 5 is similar to FIG. 4 but shows the rack in closed position with a stack of trays disposed therein.

FIG. 6 is a rear elevation of the cart in collapsed or folded condition and showing trays stored in the rack.

Referring now more particularly to the drawings reference characters will be used to denote like parts or structural features in the different views. The cart is constructed substantially in accordance with the disclosure in copending application Serial No. 166,772, filed January 17, 1962, now United States Patent No. 3,074,734.

The cart has front and rear upright support frames designated respectively at 10 and 11 which are pivotally interconnected as at 12 for relative collapsing movement. These frames each have parallel side legs for lateral stability and respectively carry wheels 14 and 15 for moving the cart over the floor surface. Upper and lower tray members or shelves denoted respectively at 16 and 17 extend in fore and aft vertically spaced parallelism between the frame legs with their rear ends pivoted on transverse axes 18 and 19 to the rear support frame 11. The shelves 16 and 17 are interconnected at points spaced forwardly from their hinge axes by rigid support rods 20 which have their ends respectively pivoted to the shelves. A cross rod 21 extends crosswise between the legs of the front frame to support the lower shelf 17 in horizontal position with the upper shelf 16 being supported by the rods 20. A pair of fore and aft extending links 22 have their ends pivoted to the lower shelf 17 and rod 21 whereby as the shelves are manipulated to swing the links forwardly over center about the rod 21, the frames 10 and 11 and shelves 16 and 17 will be collapsed into a generally parallel position for storage with the shelves hanging downwardly from their hinge axes with one partially overlapping the other as in FIG. 6.

The present invention concerns the providing of a storage means for individual trays 24 such as TV trays on this type of serving cart. These trays have a generally flat rectangular shape with a shallow dished central portion surrounded by a marginal rim 25 allowing the trays to fit closely together in a stacked relation.

The rack for supporting the trays 24 under the shelf 16 will now be described in detail. A hinge rod 26 is mounted to extend transversely under the front portion of shelf 16, the rod ends being supported by the rim extending around the shelf. The rack comprises a U-shaped wire frame 27 having eyelets 28 formed at the ends of the parallel side legs 29 thereof with said eyelets being journaled on the rod 26 to form a hinge connection between the frame and the rod. Spacers 30 prohibit axial sliding movement of the eyelets 28 along the rod 26.

The legs 29 of the frame 27 are provided with transversely opposing dipped portions 30 near the front ends thereof to support a fixed cross rod 31 in a plane with legs 29. The bight portion 32 of the frame 27 is also in the common plane of the legs 29 and is parallel to the rod 31. The frame portions 29, 31 and 32 thus form a rectangle adapted to fit closely around the dished portion of the tray 24 and form a seat or well, therefore prohibiting longitudinal or sidewise movement of the tray.

Near the frame end rod 32 legs 29 are dipped downwardly out of their plane as at 34 in the same manner as at 30. These dips 34 are transversely opposing each other on the respective legs 29 and serve as pedestals for the rack extending slightly below the bottom surface of the lowermost tray resting in the rack.

The shelf hinge 18 is actually effected by means of ears 35 which depend from the sides of the shelf with their lower ends turned outwardly and coaxially journaled in the adjacent legs of frame 11. These ears 35 are disposed in transverse alignment with the rack pedestals 34.

A closure bar 36 extends transversely under the rack between the ears 35 to lie under the pedestal portions 34. This bar has cranks 37 formed at its ends which are journaled in the ears 35. At one side the crank extends through the ear and carries an operating lever 38 (FIG. 2) at its ends which extends radially from the crank journal and then inwardly as at 39 so that rotary movement of the closure bar in one direction is blocked by ear 35 and in the other direction by the pivot forming ear terminal 18.

It will be seen that when the closure bar is down, as in FIGS. 1 through 4, the control lever 38 will also extend downwardly from the bar journal axis. When in this condition the rack is down or in open position allowing insertion or withdrawal of the trays 24. The trays cannot slide out of the rack, however, as they are seated behind the end rod 32. As the lever 38 is swung upwardly, the bar 36 acting against pedestals 34 will close the rack and just after the bar swings forwardly over the center of its turning axis, the lever portion 39 will engage the ear 18 and the weight of the trays and rack will hold the closure rod in rack closing position. This condition will prevail during collapsing and re-erecting movement of the cart.

Inasmuch as the rack opens only from the rear end and the shelves 16 and 17 fold downwardly, the trays 24 will not slide out of the rack even though it be accidentally left open during collapsing of the cart. There is sufficient clearance between the shelves with the cart collapsed to allow opening and closing movement of the rack when the cart is collapsed. The trays 24 may accordingly be inserted or withdrawn from the rack at any time.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a serving cart having a shelf member foldable about a horizontal axis at one end between an erect horizontal position and a collapsed generally vertical position, a device for holding a stack of independent serving trays against the underside of the shelf comprising a frame hinged to the underside of the shelf near the end thereof remote from said horizontal axis, said hinge axis being parallel to said horizontal axis, and a releasable locking device on the shelf for locking the frame to the shelf to hold trays on the frame firmly against the underside of the shelf, said locking device being disposed adjacent said horizontal axis for engaging a portion of the frame remote from said hinge axis.

2. In a cart having a tiltable shelf, a rack for supporting a stack of individual rectangular serving trays under the shelf comprising a generally rectangular wire frame adapted to engage under peripheral portions of the bottom tray in the stack and having one end portion hingedly connected to the shelf with the frame extending longitudinally thereunder, and means for supporting the other end of the frame for movement of the frame between a closed position extending substantially parallel to the shelf to hold the stack firmly thereagainst and an open position diverging from the shelf in its extension from the hinge axis to allow endwise removal of the trays.

3. The subject matter of claim 2 wherein said means comprises a crank journaled on the shelf and having an offset finger engaging the underside of the frame to raise the frame to its closed position as the crank is turned in one direction and to lower the frame to its open position as the crank is turned in the opposite direction, and means limiting turning of the crank in either direction.

4. The subject matter of claim 3 wherein the finger is positioned to pass over the center of the crank journal axis on raising movement of the frame so that the weight of the trays will gravitationally hold the frame in closed position.

5. In a serving cart having a foldable shelf supporting structure and a shelf member having one end pivoted on a horizontal axis to the structure for movement between an erect horizontal position and a collapsed generally vertical position, a rack mounted on the underside of the shelf for movement therewith, said rack having portions extending generally parallel to and in spaced relation below the shelf for holding a plurality of serving trays in stacked arrangement under the shelf and in parallelism therewith, the rack having means on its sides and the end remote from said pivot for retaining the trays in the rack and having an opening at the end adjacent said pivot axis for insertion and removal of the trays so that the rack will hold the trays but permit insertion or removal thereof through said opening whether the shelf member be in horizontal or vertical position.

6. In an article of furniture having an elevated horizontal shelf member, a tray rack having one end fixedly hinged to the underside of the shelf member and adapted to support a stack of individual tray members against the underside of the shelf member, said rack being vertically swingable about its hinged end between a closed position holding the trays against the shelf member and an open position allowing endwise removal of the trays, and a control mounted on the article and engageable with the swingable end portion of the rack to selectively lock the rack in closed position and to limit opening movement thereof.

7. The subject matter of claim 6 wherein the control comprises a crank member journaled on the article and having an offset rod portion engaging the underside of the rack.

References Cited in the file of this patent
UNITED STATES PATENTS

| 1,143,489 | Berchtold | June 15, 1915 |
| 2,748,841 | Rimkus | June 5, 1956 |
| 2,875,905 | Teffer et al. | Mar. 3, 1959 |
| 2,973,807 | Close | Mar. 7, 1961 |
| 3,074,734 | Munson et al. | Jan. 22, 1963 |